(12) United States Patent
Chin et al.

(10) Patent No.: US 7,697,797 B2
(45) Date of Patent: Apr. 13, 2010

(54) ALIGNED EMBOSSED DIAPHRAGM BASED FIBER OPTIC SENSOR

(75) Inventors: Ken K Chin, Pine Brook, NJ (US); Guanhua Feng, Dover, NJ (US); Ivan Padron, Carteret, NJ (US); Harry Roman, East Orange, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 18 days.

(21) Appl. No.: 12/237,744

(22) Filed: Sep. 25, 2008

(65) Prior Publication Data
US 2009/0086214 A1    Apr. 2, 2009

Related U.S. Application Data

(63) Continuation of application No. 11/750,569, filed on May 18, 2007, now abandoned.

(60) Provisional application No. 60/801,943, filed on May 19, 2006, provisional application No. 60/801,910, filed on May 19, 2006.

(51) Int. Cl.
| | |
|---|---|
| G02B 6/00 | (2006.01) |
| G02B 6/12 | (2006.01) |
| G02B 6/26 | (2006.01) |
| G02B 6/32 | (2006.01) |
| G02B 6/42 | (2006.01) |
| G02B 6/38 | (2006.01) |
| G01B 9/02 | (2006.01) |

(52) U.S. Cl. ............................. 385/12; 385/11; 385/13; 385/14; 385/15; 385/32; 385/39; 385/73; 356/477; 356/478; 356/480; 356/519

(58) Field of Classification Search ............. 385/11–15, 385/32, 39, 73; 356/477, 478, 480, 519
See application file for complete search history.

(56) References Cited

U.S. PATENT DOCUMENTS 4,343,657 A    8/1982    Ito et al.

(Continued)

OTHER PUBLICATIONS

International Preliminary Report on Patentability and Written Opinion for corresponding PCT application PCT/US2007/011955 (formsPCT/IB/326/373/ISA/237) Mailed Dec. 4, 2008.

(Continued)

*Primary Examiner*—Brian M. Healy
*Assistant Examiner*—Hung Lam
(74) *Attorney, Agent, or Firm*—Timothy X. Gibson, Esq.; Gibson & Dernier LLP

(57) ABSTRACT

The present invention is a diaphragm-fiber optic sensor (DFOS), interferometric sensor. This DFOS is based on the principles of Fabry-Perot and Michelson/Mach-Zehnder. The sensor is low cost and is designed with high efficiency, reliability, and Q-point stability, fabricated using MEMS (micro mechanic-electrical system) technology, and has demonstrated excellent performance. A DFOS according to the invention includes a cavity between two surfaces: a diaphragm made of silicon or other material with a rigid body (or boss) at the center and clamped along its edge, and the endface of a single mode optic fiber. By utilizing MEMS technology, the gap width between the diaphragm and the fiber endface is made accurately, ranging from 1 micron to 10 microns. To stabilize the Q-point of the DFOS when in use as an acoustic sensor, a system of microchannels is built in the structure of the diaphragm so that the pressure difference on two sides of the diaphragm is kept a constant, independent of the hydraulic pressure and/or low frequency noise when the device is inserted in liquid mediums.

27 Claims, 12 Drawing Sheets

U.S. PATENT DOCUMENTS

| | | | |
|---|---|---|---|
| 4,933,545 | A | 6/1990 | Saaski et al. |
| 5,280,173 | A * | 1/1994 | Morse et al. ............ 250/227.23 |
| 5,311,485 | A * | 5/1994 | Kuzmenko et al. ........... 367/149 |
| 6,055,080 | A | 4/2000 | Fürstenau et al. |
| 6,351,593 | B1 | 2/2002 | Pollack et al. |
| 6,628,799 | B2 | 9/2003 | Fukuda |
| 6,631,638 | B2 | 10/2003 | James et al. |
| 6,738,145 | B2 * | 5/2004 | Sherrer et al. ................ 356/480 |
| 6,820,488 | B2 | 11/2004 | Lenzing et al. |
| 6,928,879 | B2 | 8/2005 | Partridge et al. |
| 6,967,362 | B2 | 11/2005 | Nam et al. |
| 7,224,465 | B2 * | 5/2007 | Balachandran et al. ...... 356/480 |
| 7,305,158 | B2 * | 12/2007 | Jeffers et al. ................... 385/15 |
| 2004/0067005 | A1 * | 4/2004 | Miyazawa et al. ............ 385/13 |
| 2004/0119981 | A1 * | 6/2004 | May ........................... 356/480 |
| 2005/0134837 | A1 | 6/2005 | Sarkozi et al. |
| 2005/0157305 | A1 | 7/2005 | Yu et al. |

OTHER PUBLICATIONS

M. Born and E. Wolf, Principles of Optics, p. 327, 6th Edition, Pergamon Press, (1980).

S. Timoshenko, Strenght of Materials, Part II, 3rd Edition, p. 97, D. Van Nostrand Co., 1956.

E. Hecht, Optics, p. 336, 2nd Edition, Addison-Wesley Publishing Co. (1987).

R. A. Atkins, J. H. Gardner, W. N. Gibler, C. E. Lee, M. D. Oakland, M. O. Spears, V. P. Swenson, H. F. Taylor, J. J. McCoy, and G. Beshouri, "Fiber Fabry-Perot pressure sensors for internal combustion engines", Applied Optics, vol. 33, No. 7, pp. 1315-1319, Mar. 1994.

B. Yu, D. W. Kim, J. Deng, H. Xiao and A. Wang, "Fiber Fabry-Perot sensors for detection of partial discharges in power transformers", Applied Optics, vol. 42, No. 16, pp. 3241-3250, Jun. 2003.

M. Yu, "Acoustic Measurements Using a Fiber Optic Sensor System", Journal of Intelligent Systems and Structures, Vo. 14, No. 7, 409-414 (2003).

Xiaodong Wang, et al. "an ultra-sensitive optic MEMS sensor for partial discharge detection". Journal of Micromechanics and Microengineering, vol. 15, pp. 521-527 (2005).

International Search Report and Written Opinion of Feb. 13, 2008 in International Application No. PCT/US07/11955, filed May 18, 2007.

Amnon Yariv, Optic Electronics, 3rd edition, p. 29, Library of Congress Cataloging in Publication Data, (1985).

Mario di Giovanni, Flat and Corrugated Diaphragm Design Handbook, Marcel Dekker, New York and Base, 1982.

P. M. Eleftherion, "Partial Discharge XXI: Acoustic Emission-Based PD Source Location in Transformers", IEEE Electrical Insulation Magazines, No. 6, pp. 22-26 Nov./Dec. 1995.

M. Minhas, J.P. Reynders, P.J. de Klerk: "Failure in power system transformers and appropriate monitoring techniques", 11th Int. Symposium on High Voltage Engineering, London, paper 1.94.S23, (1999).

I Oanca, GY Yang, J Katsifolis, E Tapanes, "Simultaneous Wavelength Multiplexed Fiber Optic Communications And Cable Integrity Monitoring" Lasers and Electro-Optics, 1997. CLEO/Pacific Rim'97.

Youngmin Kim and Dean P. Neikirk, "Design for Manufacture of Micro Fabry-Perot Cavity-based Sensors," Sensors and Actuators A 50, Jan. 1996, pp. 141-146.

International Search Report and Written Opinion for corresponding PCT application PCT/US07/11954, Dec. 5, 2008 (Form PCT/ISA/220/210).

* cited by examiner

L~2-5μm
t~20-100μm
Pf-FRONT PRESSURE
Pl-LATERAL PRESSURE
Pb-BACK PRESSURE

ALIGNED EMBOSSED DIAPHRAGM BASED FIBER OPTIC SENSOR

CROSS REFERENCE TO RELATED APPLICATIONS

This application is a continuation of U.S. patent application Ser. No. 11/750,569, filed May 18, 2007 now abandoned, and claims the benefit of U.S. Provisional Application No. 60/801,943, filed May 19, 2006 and U.S. Provisional Application No. 60/801,910, filed May 19, 2006 which are incorporated herein by reference in their entireties.

FIELD OF THE INVENTION

This invention involves the design and fabrication of an aligned embossed diaphragm based fiber optic sensor (DFOS) using MEMS technology based on the principles of Fabry-Perot and Michelson/Mach-Zehnder.

BACKGROUND OF THE INVENTION

1. Principles of Plane Wave Interferometric Sensor 1.1. Principles of Classical Plane Wave Fabry-Perot Interferometric Sensor The theory of Fabry-Perot sensor is based on classical Fabry-Perot interferometry of plane waves (FIG. 1). Due to interference of multiply reflected beams, the intensity of the total reflected light $I^{(o)}$ is expressed as Airy function $$I^{(o)} = \frac{F\sin^2\frac{\delta}{2}}{1 + F\sin^2\frac{\delta}{2}} I^{(i)} \quad (1)$$

where $I^{(i)}$ is the intensity of the incident light, and $\delta$ the phase dependent on the optic path or interference gap width L. F is the finesse, defined by $$F = \frac{4R}{(1-R)^2} \quad (2)$$

where $$R = \sqrt{|r'r''|} \quad (3)$$

r' and r" being the reflection coefficient at the interface of the media with n and n', and that with n and n", respectively. When F is small, say F<0.2, which corresponds to R<0.046, equation (1) can be approximated as [1]

$$\frac{I^{(o)}}{I^{(i)}} \approx F\sin^2\frac{\delta}{2} = \frac{F}{2}(1 - \cos\delta) = \frac{F}{2}\left[1 + \sin\left(\frac{4\pi n}{\lambda}L + \phi_o\right)\right] \quad (4)$$

where $\lambda$ is the nominal wavelength of the light that generates the optic path differences of the series of reflected beams 2, n the refractive index of the medium of the gap (n~1 for air, 1.33 for water, and 1.48 for oil), L the width of interference gap, and $\phi_o$ a phase factor related to the equilibrium gap width without input signal. Note that (4) depicts $I^{(o)}$ as a harmonic function of L, based on which Fabry-Perot interferometric sensor is designed.

1.2. Principles of Classical Plane Wave Michelson/Mach-Zehnder Interferometric Sensor The principles of Michelson interferometric sensor can be depicted by FIG. 2. FIG. 2 shows source 202, beamsplitter 204, mirrors 206 and detector 208. Instead of interference of multiply reflected beams of the Fabry-Perot interferometer, the output light intensity of the Michelson interferometer is due to interference of two beams [2]. One beam contains a variable optic path under measurement, and the other is the reference. The output light intensity $I^{(o)}$ of an ideal lossless Michelson interferometer is expressed as $$I^{(o)} = I_1^{(i)} + I_2^{(i)} + 2\sqrt{I_1^{(i)}I_2^{(i)}}\sin\left(\frac{4\pi n}{\lambda}L + \phi_o\right) \quad (5)$$

where $I_1^{(i)}$ and $I_2^{(i)}$ are the intensity of the probing beam and the reference beam, respectively. When $I_1^{(i)}=I_2^{(i)}=I^{(i)}$, (5) is reduced to $$I^{(o)} = 2I^{(i)} + 2I^{(i)}\sin\left(\frac{4\pi n}{\lambda}L + \phi_o\right) \quad (6)$$

A third type of optical interference device is Mach-Zehnder interferometric sensor (FIG. 3). In a Michelson type interferometric device there is only one beam splitter or coupler, while both the sensing leg and the reference leg reflect back from the mirrors. On the other hand, in a Mach-Zehnder type device there are two beam splitters or couplers, while neither the sensing leg nor the reference leg reflect back from the mirrors. Ideally they both observe equation (6). Therefore, these are referred to herein as Michelson/Mach-Zehnder interferometric sensors.

1.3. Comparison of Plane Wave Fabry-Perot and Michelson/Mach-Zehnder Interferometric Sensors As shown in FIGS. 1, 2 and 3, 3 dB or 50%-50% beam splitters are necessary to construct the Fabry-Perot or Michelson/Mach-Zehnder interferometric sensors. FIG. 3 includes source 302, beamsplitters 304, mirrors 306, and detector 310. The meaningful way is to define the light source output intensity as the input intensity $I_{(in)}$ of the interferometric sensor, and the light intensity received by the detector as the output intensity $I_{(out)}$. Thus, an ideal Fabry-Perot interferometric sensor has $$I_{(out)} \approx \frac{F}{8}\left[1 + \sin\left(\frac{4\pi n}{\lambda}L + \phi_o\right)\right]I_{(in)} < \frac{1}{40}I_{(in)} + \frac{1}{40}\sin\left(\frac{4\pi n}{\lambda}L + \phi_o\right)I_{(in)} \quad (7)$$

while an ideal Michelson/Mach-Zehnder interferometric sensor has $$I_{(out)} = \frac{1}{2}\left[1 + \sin\left(\frac{4\pi n}{\lambda}L + \phi_o\right)\right] < \frac{1}{2}I_{(in)} + \frac{1}{2}\sin\left(\frac{4\pi n}{\lambda}L + \phi_o\right)I_{(in)} \quad (8)$$

The efficiency in terms of $I_{(out)}/I_{(in)}$ of a Michelson/Mach-Zehnder type interferometric sensor is more than 20 times higher than that of a Fabry-Perot type interferometric sensor.

SUMMARY OF THE INVENTION

One embodiment of the present invention is a diaphragm-fiber optic sensor (DFOS), interferometric sensor based on the principles of Fabry-Perot and Michelson/Mach-Zehnder. More specifically, the present invention is an aligned embossed diaphragm based fiber optic sensor fabricated using MEMS (micro mechanic-electrical system) technology. The DFOS includes a cavity between a mechanically clamped diaphragm and the endface of a single mode optic fiber. More specifically, the diaphragm may be embossed and may contain microchannels. The present invention is also a method of fabricating these sensors in their multiple embodiments. The present invention can be used for optical, mechanical, pressure, temperature, chemical, biometric or acoustic sensing. One specific application is the detection of on-line acoustic signature of sparking and arcing in a multitude of applications including: large electric utility transformers, auto-transformers, tap-changers, phase angle regulators, voltage regulators, reactors, circuit breakers, pipe-type high voltage cables, and other oil insulated utility and electric equipment.

BRIEF DESCRIPTION OF THE DRAWINGS

To assist those of ordinary skill in the relevant art in making and using the subject matter hereof, reference is made to the appended drawings, wherein.

DETAILED DESCRIPTION OF THE INVENTION

Figure 1:
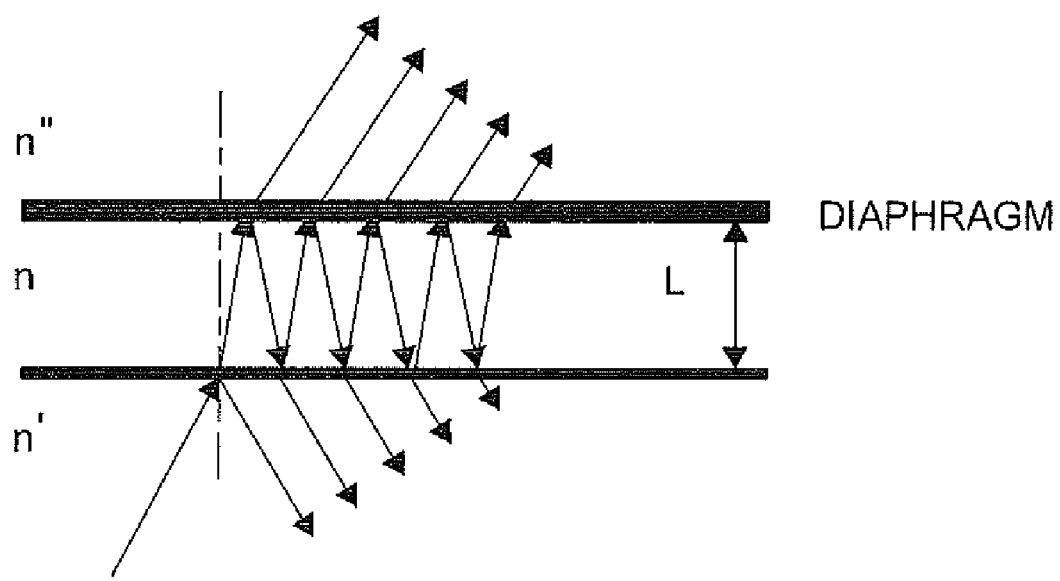
FIG. 1 depicts the classical Fabry-Perot interferometer.
Figure 2:
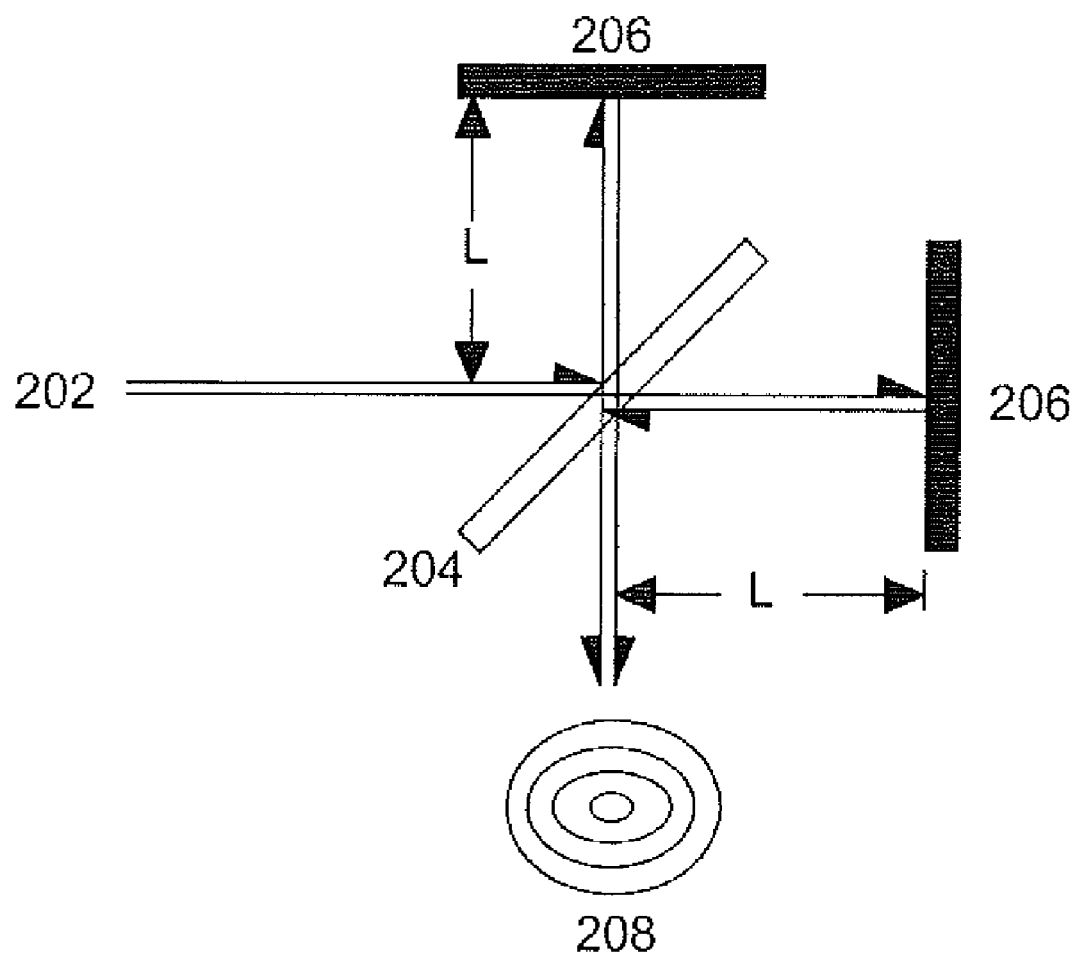
FIG. 2 depicts the classical Michelson/Mach-Zehnder interferometer.
Figure 3:
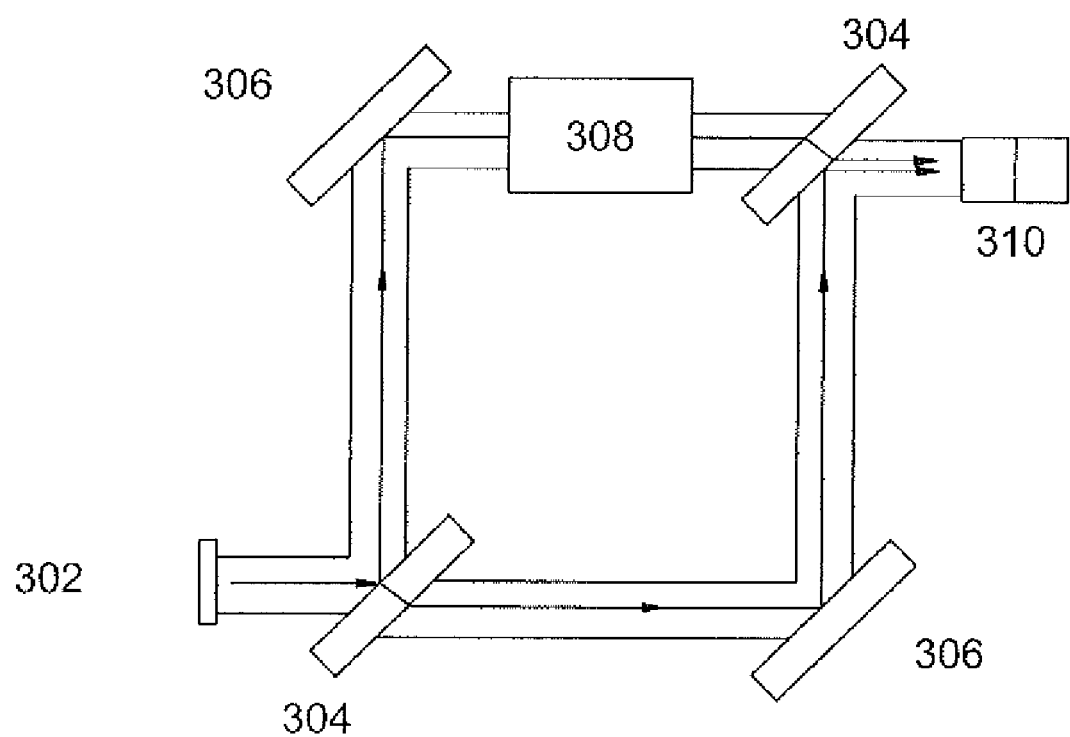
FIG. 3 depicts a Mach-Zehnder interferometric sensor with its sensing branch and reference branch symmetric and merging at a second beam splitter or coupler.

Definition of Symbols $V_{FP}$ the output voltage of the DFOS $V_{FPo}$ the maximum of output voltage of the DFOS n refractive index of the medium; for air n~1

$\lambda$ wavelength of the light used for the DFOS

L the width of the narrow gap between the back of the diaphragm and the end surface of the single mode optic fiber $L_o$ the equilibrium width of the narrow gap diaphragm and the optic fiber $\phi_o$ the Q-point phase factor determined by the equilibrium width of the interference gap E Young's modulus of the material of the diaphragm $\nu$ Poisson coefficient of the material of the diaphragm $\eta$ the constant of proportionality in the equation of displacement versus pressure, which is dependent on the geometric shape of the diaphragm u the thickness of the silicon wafer (or other material) used for the fabrication of the DFOS diaphragm t the thickness of the diaphragm of the DFOS a the square silicon chip (or other material) size of the DFOS b the size or length of the square diaphragm of the DFOS c the size of the embossed square center e the length of the microchannel f the width of the microchannel f' the width of the narrow bottleneck of the microchannel $D_{out}$ the external diameter of the stainless steel tube for the assembling of the DFOS $D_{in}$ the internal diameter of the stainless steel tube for the assembling of the DFOS, which is equal to the diameter of the ferrule $P_o$ the pressure needed for the diaphragm to bend ⅛ of the wavelength of the light $\lambda/n$ $P_{atm}$ the atmospheric pressure $P_a$ the maximum pressure of the acoustic wave $P_f$ the pressure at the front side of the diaphragm of the DFOS $P_b$ the pressure at the back side of the diaphragm of the DFOS $P_l$ the pressure at the lateral side of the diaphragm of the DFOS $P_{cap}$ capillary pressure of the liquid in the microchannel $P_1$ the initial air pressure of the cavity, or at the backside of the diaphragm before the DFOS is immersed in the liquid $P_2$ the final air pressure of the cavity, or at the backside of the diaphragm after the DFOS is immersed in the liquid $V_1$ the initial air volume of the cavity or the backside of the diaphragm before the DFOS is immersed in the liquid $V_2$ the final air volume of the cavity or at the backside of the diaphragm after the DFOS is immersed in the liquid $\rho$ the density of the liquid the DFOS is immersed in g gravitational acceleration, ~9.8 m/s² h the depth of the liquid

NA numerical aperture of the fiber $\theta_{beam}$ angle of spreading of the Gaussian beam $w_o$ waist of the Gaussian beam $z_o$ Rayleigh length of the Gaussian beam R wave front radius of the Gaussian beam $n_f$ refractive index of the core of the step-index fiber
$n_c$ refractive index of the cladding of the step-index fiber

DETAILED DESCRIPTION

2. Principles of Gaussian Beam Interferometric Diaphragm-Fiber Optic Sensor (DFOS)

2.1 Principles of Gaussian Beam Interferometry

In recent years there has been extensive effort to develop Fabry-Perot type and Michelson/Mach-Zehnder type interferometric sensors [3-7], which utilize a single mode optic fiber to deliver the probing or interrogating light as well as to receive the measured interferometric signal. However, many published works completely ignored the fact that the light delivered and received by a fiber is not in the form of plane waves. Others dealt with the difference between the plane waves, based on which the classic theory of interferometry as well as equations (7) and (8) are established, and the Gaussian beams, which adequately and approximately describe the lights delivered and received by the fiber, albeit in an oversimplified way [8]. Lack of basic understanding of behavior of the Gaussian beam interferometry has prevented the creation of such sensors.

Figure 4:
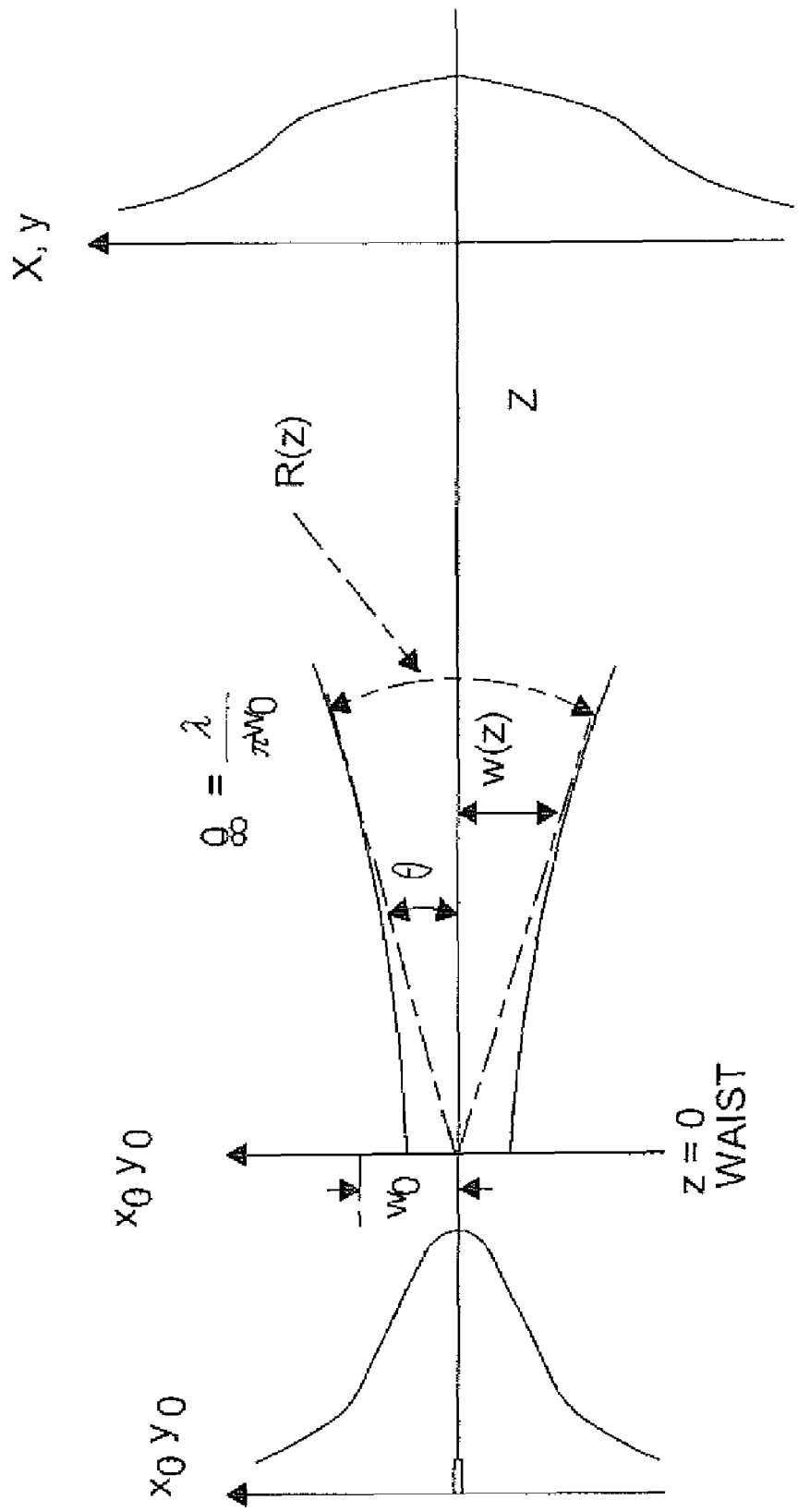
FIG. 4 is a graph depicting the characteristics of a Gaussian beam in a homogeneous medium.

As a paraxial approximation of the solution of the Maxwell equations describing light propagating in uniform medium, the Gaussian beam (as shown in FIG. 4) is expressed by its field component [9]

$$E(x, y, z) = E_o \frac{w_o}{w(z)} e^{ikz} e^{ik(x^2+y^2)/2R(z)} e^{-i\eta(z)} e^{-(x^2+y^2)/w^2(z)} \quad (9)$$

where $E_o$ is a constant, and $\eta(z)$, $R(z)$, $w(z)$, $w_o$, and $z_o$ are defined as follows $$\eta(z) = \tan^{-1}(z/z_o) \quad (10)$$

$$R(z) = z + z_o^2/z \quad (11)$$

$$w(z) = w_o\sqrt{1 + z^2/z_o^2} \quad (12)$$

$$w(z=0) = w_o \quad (13)$$

$$z_o = \frac{\pi w_o^2}{\lambda} \quad (14)$$

$z_o$ is knows as Rayleigh range and $w(z)$ is called spot size of a Gaussian beam. Spot size $w(z)$ at $z=0$ is $w_o$, called beam waist. $R(z)$ is the wavefront radius of curvature after propagating a distance z. $R(z)$ is infinite at $z=0$, passes through a minimum at some finite z, and rises again toward infinity as z is further increased.

Note that in equation (9), the first three exponential terms determine the phase of the Gaussian wave. The total phase is $$\Psi = \Psi_1 + \Psi_2 + \Psi_3 = kz + \frac{1}{2}k(x^2+y^2)/R(z) - \eta(z) \quad (15)$$

$$\Psi_1 = kz \quad (16)$$

$$\Psi_2 = \frac{1}{2}k(x^2+y^2)/R(z) \quad (17)$$

$$\Psi_3 = -\eta(z) = -\tan^{-1}(z/z_o) \quad (18)$$

$\Psi_1$ is the phase of a typical plane wave; $\Psi_2$ is the phase depends on z and also the distance from the z-axis in the plane normal to the propagation direction. $\Psi_3$ is called Gouy phase. It is shown [9] that for the same z $$\Psi_1 \gg \Psi_2, \Psi_3 \quad (19)$$

Therefore, the interference of Gaussian beam propagating in uniform medium or free space can be treated as plane wave. The only modification is the loss of intensity when the Gaussian beam couples back into the fiber due to its angular spreading.

2.2 Comparison of Gaussian Beam Interferometric Fabry-Perot and Michelson/Mach-Zehnder Diaphragm-Fiber Optic Sensors (DFOS)

Figure 5A:
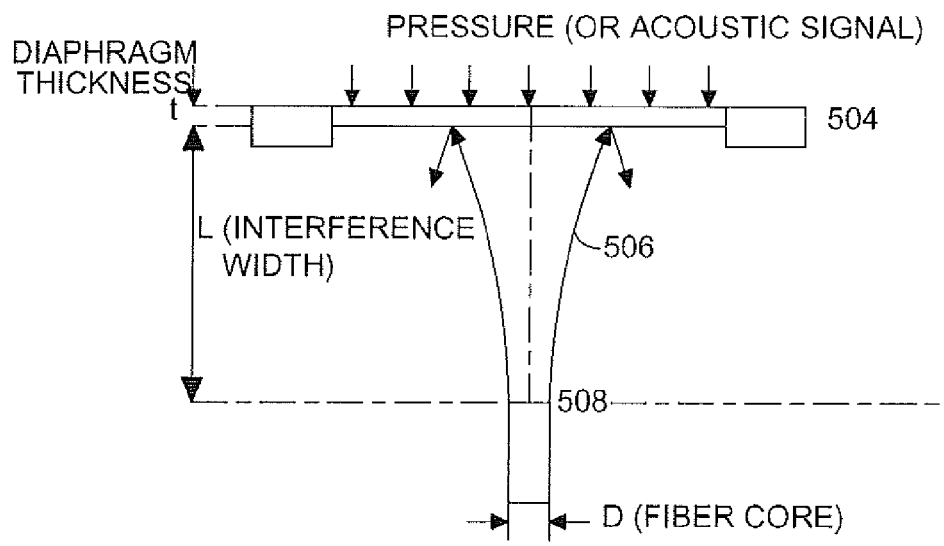
FIGS. 5A-C relate to a profile of a Gaussian beam and its reflection (Michelson/Mach-Zehnder) and multiple reflections (Fabry-Perot) in a diaphragm-fiber optic sensor (DFOS).
Figures 5B, 5C:
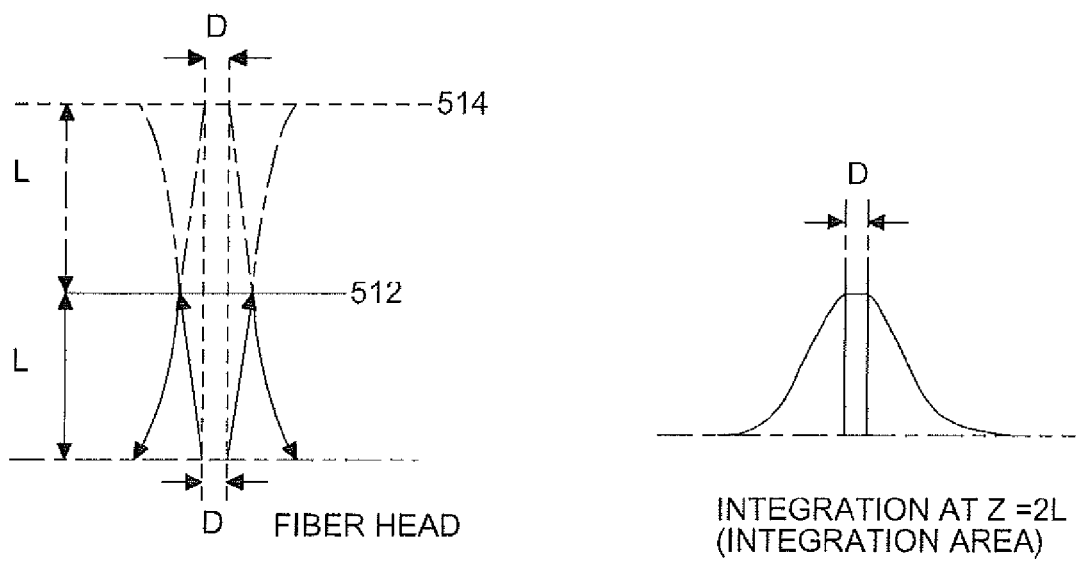

As in the case of plane waves, the Gaussian beam in a Fabry-Perot interferometer has multiple reflections, while the Gaussian beam in a Michelson/Mach-Zehnder interferometer reflects from the diaphragm only once. As shown in FIGS. 5A-C, optical power loss due to angular spreading of the Gaussian beam can be calculated using mirror symmetry. FIG. 5A shows diaphragm 502, diaphragm support 504, Gaussian Beam Profile 506, and endface 508 and FIG. 5B shows diaphragm surface 512 and imaginary surface 514. FIG. 5C shows integration at Z=2 L. The loss of the beam power returned back into the fiber after the first reflection from the diaphragm is due to angular spreading of the Gaussian beam's axial propagation of a distance of 2 L. The loss of the beam power returned back into the fiber after the second reflection from the diaphragm is due to angular spreading of the Gaussian beam's axial propagation of a distance of 4 L. As in plane wave interferometric sensors, the Gaussian beam diaphragm-fiber optic sensor (DFOS) can operate either as a Fabry-Perot interferometric device or as a Michelson/Mach-Zehnder interferometric device. The only difference in the diaphragm-fiber structure of the two types of Gaussian beam interferometric devices is in the surface coating of the diaphragm and the fiber endface. The Fabry-Perot type follows equation (3), while the Mach-Zehnder type mandates |r'|=0 and |r"|=1. The basic equations (7) and (8) can be modified with a loss factor $\alpha_{F-P}$ for the Fabry-Perot type and $\alpha_M$ for the Michelson/Mach-Zehnder type. Thus, equations (7) and (8) become $$I_{(out)} \approx \alpha_{F-P} \frac{F}{8}\left[1 + \sin\left(\frac{4\pi n}{\lambda}L + \phi_o\right)\right] I_{(in)} \quad (20)$$

and $$I_{(out)} = \alpha_M \frac{1}{2}\left[1 + \sin\left(\frac{4\pi n}{\lambda}L + \phi_o\right)\right] I_{(in)} \quad (21)$$

respectively. Note that the Gaussian beam of Fabry-Perot type interferometry undergoes multiple reflections, while that of the Michelson/Mach-Zehnder type interferometry reflects only once. Considering mirror symmetry of the Gaussian beam, each reflection is associated with beam size expansion due to angular spreading, and therefore induces coupling loss. Thus $$\alpha_{F-P} \ll \alpha_M < 1 \quad (22)$$

Furthermore, the Gaussian beam multiple reflection in a DFOS occurs between the diaphragm surface and the endface of the fiber, which is composed of a core, cladding and ferrule.

2.3 Comparison of Near Field and Far Field Gaussian Beam Interferometric Fabry-Perot and Michelson/Mach-Zehnder Diaphragm-Fiber Optic Sensors (DFOS)

The interference gap width of a Gaussian beam DFOS, either Fabry-Perot type or Michelson/Mach-Zehnder type, plays an important role in determining the performance of the device, due to loss when the Gaussian beam, the size of which was expanded due to angular spreading, couples back into the fiber. Two categories of the mode of operation of the Gaussian beam DFOS are defined for the purposes of this application—near field (NF) and far field (FF). The DFOS, either Fabry-Perot type or Michelson Mach-Zehnder type, operates in NF mode if the interference gap width under equilibrium condition (no signal) follows equation $L_o < z_o$. The DFOS, either Fabry-Perot type or Michelson/Mach-Zehnder type, operates in FF mode if the interference gap width under equilibrium condition (no signal) follows equation $L_o > z_o$. It follows that $$\alpha^{(NF)}_{F-P} > \alpha^{(FF)}_{F-P}, \alpha^{(NF)}_M > \alpha^{(FF)}_M \tag{23}$$

In addition to efficiency, probable misalignment of the fiber, with respect to the diaphragm favors near field operation rather than far field operation. In each of the three types of misalignment—axial, lateral, and angular, more light is lost when the fiber is farther away from the diaphragm.

To summarize, the Michelson/Mach-Zehnder DFOS is preferred over the Fabry-Perot DFOS, but more difficult to implement. Near field mode is preferred than far field mode unless the endface of the fiber should be kept at a distance greater than the Rayleigh range $z_o$ away from the diaphragm.

3. Design of Gaussian Beam DFOS

3.1 Design Consideration for Fabry-Perot Type and Michelson/Mach-Zehnder Type Gaussian Beam DFOS There are two differences in Fabry-Perot type and Michelson/Mach-Zehnder type DFOS. The Fabry-Perot type DFOS has only one fiber delivering and receiving light, while the Michelson/Mach-Zehnder type DFOS has two fibers preferably of the same length, one for measuring the optic path of the interference gap width, and the other, the endface of which is coated with gold or aluminum for 100% reflection, for reference.

The second difference is in the surface coating. For Fabry-Perot type DFOS, if neither the endface of the fiber nor the diaphragm is coated, then $$R = r'r'' = \frac{n'-n}{n'+n} \cdot \frac{n''-n}{n''+n} = 0.187 \times 0.551 = 0.103 > 0.046 \tag{24}$$

which characterizes the air (n=1) gap between the fiber ($SiO_2$, n'=1.46) and the diaphragm (Si, n''=3.45). Therefore, in order for the Airy function of Fabry-Perot interferometry to be approximated by a harmonic function for sensor application, the fiber endface can be coated with antireflection coating to reduce its r' from 0.187 to 0.0835. For Michelson/Mach-Zehnder type DFOS, the fiber endface is coated with antireflection coating so that the transmission coefficient is close to 100%, while the Si surface of the diaphragm is coated with Au or Al so that the reflection coefficient is close to 100%.

3.2 Design Consideration for Near Field and Far Field Gaussian Beam DFOS

Device assembly is the key difference between a near field DFOS and a far field DFOS.

In one embodiment, for NF sensor, the interference width gap or the distance between the diaphragm and the fiber endface $L_o$ is kept at 1~10 microns by using MEMS technology. In another embodiment for FF sensor, $L_o$ is kept much larger, and therefore its assembly is not as demanding as its NF counterpart.

3.3. Design of the Lateral Size and Diaphragm of the Gaussian Beam DFOS

Under the condition of small bending where the displacement of the diaphragm $L_o - L$ is much smaller than the thickness t of the diaphragm, the displacement is proportional to the pressure acted on the diaphragm $$\Delta L = L_o - L = \frac{b^4(1-v^2)}{16\eta E t^3} P \tag{25}$$

where b denotes the size of the clamped or rigidly supported diaphragm, t the thickness of the diaphragm, v and E the Poisson coefficient and Young's modulus of the diaphragm material, respectively. For a circular diaphragm with uniform thickness of diameter b, $\eta$=5.33. For a square diaphragm with the side length b, $\eta$=4.82 [10]. In one embodiment of a circular diaphragm according to the invention including a circular center emboss (FIG. 6) [11]

$$\eta = \frac{1}{3\left(1 - \frac{c^4}{b^4} - 4\frac{c^2}{b^2}\ln\frac{b}{c}\right)} \tag{25'}$$

In one embodiment of a square diaphragm with a square center emboss according to the invention may require a numerical calculation using ANSIS simulation software.

Substituting (25) into (21) and (21), it follows that $$I_{(out)} \approx \alpha_{F-P} \frac{F}{8}\left[1 + \sin\left(\frac{\pi}{2P_o}P + \phi_o\right)\right]I_{(in)} \tag{26}$$

and $$I_{(out)} \approx \alpha_M \frac{1}{2}\left[1 + \sin\left(\frac{\pi}{2P_o}P + \phi_o\right)\right]I_{(in)} \tag{27}$$

for Fabry-Perot and Michelson/Mach-Zehnder DFOS operating as a pressure or acoustic sensor, respectively. $P_o$ is the pressure for the interference gap between the diaphragm and the fiber endface to reduce by ⅛ of the wavelength $$P_o = \frac{2\eta E t^3 \lambda}{b^4(1-v^2)n} \tag{28}$$

3.4 Design of Embossed Center in the Diaphragm of the Gaussian Beam DFOS

In one embodiment of a piezoresistive pressure sensor, the sensing element diaphragm is designed with an embossed center to make the structure stable. In DFOS the distance between the diaphragm and the fiber endface may be kept within 1~10μ for near field operation. Micro electro-mechanic system (MEMS) technology should be used. In one embodiment of the present invention, the incorporation of a preferably rigid embossed center in the diaphragm design (FIG. 6) of the DFOS has the following advantages:

3.4.1 A near field 1~10μ interference gap is much easier to process and maintain for a small area—the surface of the embossed center—than the whole area of the diaphragm.

Figure 6:
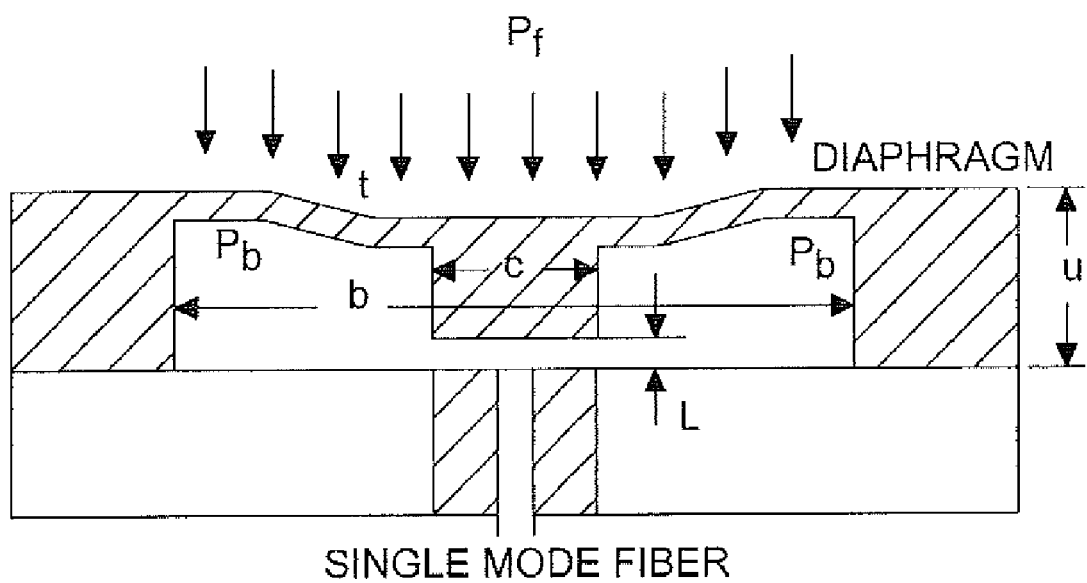
FIG. 6 depicts the structure of the embossed center of the diaphragm-fiber optic sensor (DFOS).

3.4.2 In one embodiment, the incorporation of a small embossed center reduces considerably the back pressure from the backside of the silicon diaphragm, which will reduce the sensibility of the DFOS. Backpressure is defined as the dynamic pressure change in the sensor cavity, which is bound by the back surface of the diaphragm and the surface of the fiber with ferrule and includes the interference gap, due to the dynamic pressure variation at the front of the diaphragm. By the law of ideal gas, $$\Delta P_b = -\frac{\Delta V_b}{V_b} P_b \tag{29}$$

where $P_b$ is the equilibrium back pressure, $V_b$ the equilibrium back volume, $\Delta P_b$ the back pressure increase due to the diaphragm bending $\Delta L$ caused back volume decrease of $\Delta V_b$. By using equation (25), it follows that $$\Delta V_b = \alpha b^2 \Delta L = -\alpha \frac{b^6(1-v^2)}{16\eta E t^3} \Delta P_f \tag{30}$$

where $\Delta P_f$ is the pressure increase at the front of the diaphragm, and $\alpha$ depends on the shape of bended diaphragm. $\alpha$ is assumed to be ~0.5 if the diaphragm keeps straight during bending, and >0.5 for a more realistic and curved diaphragm bending. As shown in FIG. 6, the following is true $$V_b = (b^2 - c^2)(u - t - L) + b^2 L \tag{31}$$

Substituting (9) in (7) and (8), it follows that $$\frac{\Delta P_b}{\Delta P_f} = \alpha \frac{16\eta E t^3 P_b}{b^6(1-v^2)} \frac{1}{(b^2-c^2)(u-t-L)+b^2 L} \tag{32}$$

In a DFOS with a rigid embossed center, u−t−L is a few orders greater than L, while in the DFOS without an embossed center u−t=L. Therefore, $$\left(\frac{\Delta P_b}{\Delta P_f}\right)_{u-t \gg L} \ll \left(\frac{\Delta P_b}{\Delta P_f}\right)_{u-t=L} \tag{33}$$

Since the sensitivity of the DFOS is proportional to the pressure difference of front side and back side of the diaphragm $$\frac{\Delta P_f - \Delta P_b}{\Delta P_f} = 1 - \frac{\Delta P_b}{\Delta P_f} \tag{34}$$

Thus the sensitivity of the DFOS with an embossed center is greater than that without it.

Figure 7:
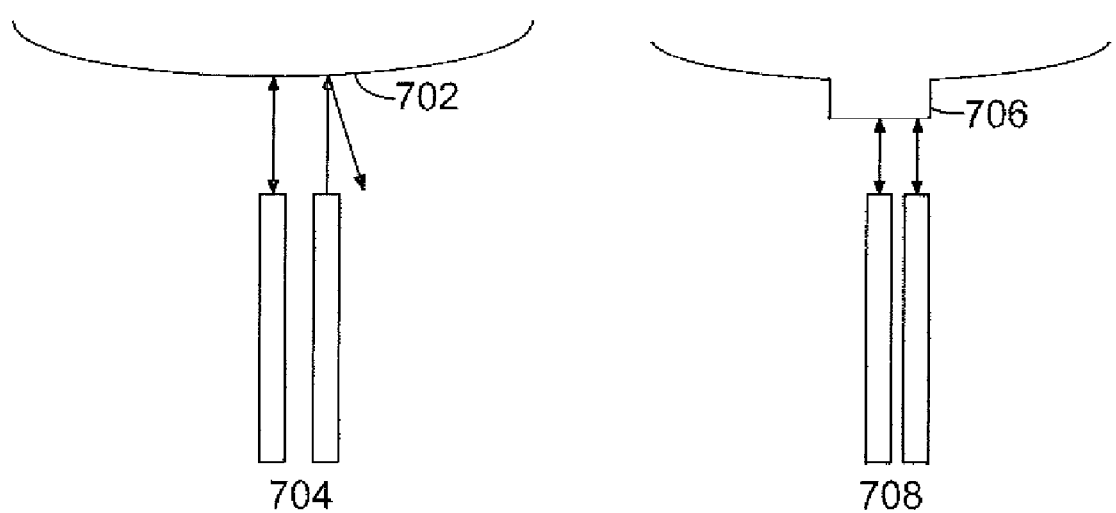
FIG. 7 shows the lateral diaphragm-fiber misalignment of a diaphragm-fiber optic sensor (DFOS) without the embossed center in contrast with the alignment of a diaphragm-fiber optic sensor (DFOS) with the embossed center.

3.4.3 Among the three types of misalignment—axial, lateral, and angular—of the fiber with respect to the diaphragm, the lateral is the most severe one for a flat diaphragm, since the reflected light may completely miss the fiber core (see fibers 704 in FIG. 7). For one embodiment, as shown in FIG. 7, the embossed center 706 can avoid the lateral misalignment (which occurs from non-embossed diaphragm 702) which caused low optical efficiency as well as the noise. But using MEMS technology, the embossed center can also keep the two surfaces of the gap parallel at an exact distance to avoid any misalignment-caused loss of efficiency, noise, non-uniformity and low reliability of the DFOS. This is accomplished because embossed center 706 reflects directly back to fiber core 708.

Figure 8:
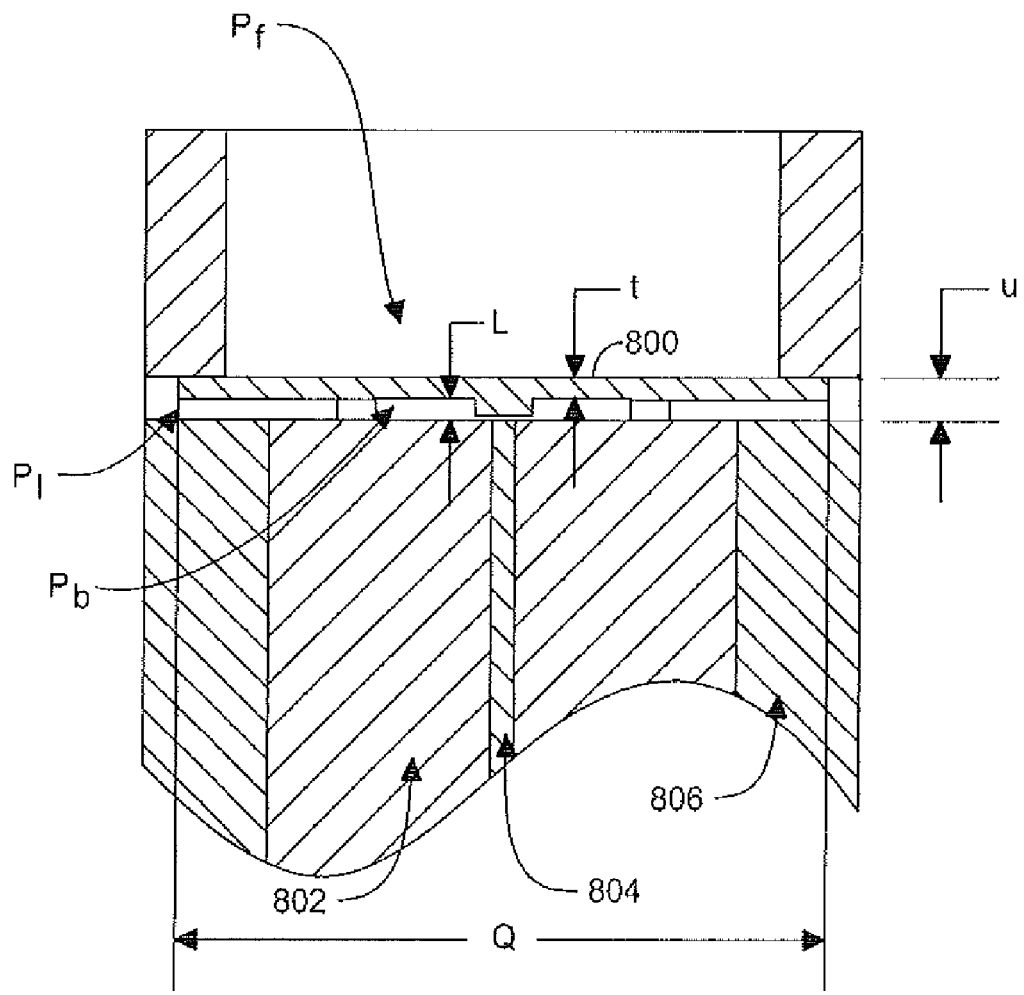
FIG. 8 depicts the principles of Q-Point stabilization of DFOS using microchannels along with labels for components of the diaphragm-fiber optic sensor (DFOS).

3.4.4 In one embodiment, as shown in FIG. 8, diaphragm 800 made by MEMS technology can be clamped onto the fiber (804)-ferrule (802)-stainless steel (806) (or other material) frame by mechanical, chemical, soldering, glueing, anodic bonding, and other method. As shown in FIG. 8, in mechanical bonding, a spring tightened by a screw is used to give pressure to the diaphragm so that it is clamped onto the fiber-ferrule-stainless steel (or other material) frame; and by adjusting the pressure applied to the diaphragm, the interference gap width, or quadrant- or Q-point, can be adjusted due to the elastic yielding of the bottom material of the diaphragm.

3.5 Design of Resonant Frequency of the Gaussian Beam DFOS

One of the important applications or embodiments of the DFOS being developed is in its functioning as an acoustic sensor immersed in the insulating oil of utility transformers to detect ultrasonic signal or pressure wave P(t) due to partial discharge (PD) [5-7, 12-14]. When the DFOS operates as an acoustic sensor, the design of the diaphragm—shape, size, and thickness—determines its resonant frequency. For PD application, it is optimal to measure the acoustic emission around 150 kHz. By using either analytical or numerical method, the required single mode resonant frequency can be achieved to enhance sensitivity at a certain frequency. A diaphragm with multi mode vibrations can also be designed, which can obtain broad band response in other embodiments.

3.6 Design of Q-Point Stabilized Gaussian Beam DFOS by Using Micro-channels 3.6.1 Importance of Q-Point Stabilization When DFOS is used as an acoustic sensor, the optic signal is turned into an electrical signal by a photodiode, followed by amplifiers, and a DC filter. The output voltage of the DFOS, either Fabry-Perot or Michelson/Mach-Zehnder, as a function of the acoustic signal is expressed as $$V(t) = V_o \sin\left[\frac{\pi}{2P_o} P(t) + \phi_o\right] \tag{35}$$

Sensitivity of the acoustic sensor S is defined as the ratio of the voltage output and small acoustic signal input $$S \equiv V'(P)|_{P=0} = V_o \frac{\pi}{2P_o} \cos\left(\frac{\pi}{2P_o} P + \phi_o\right) = V_o \frac{\pi}{2P_o} \cos\phi_o \tag{36}$$

which depends on the zero input (P=0) initial phase $\phi_o$. The sensitivity of the DFOS is determined by $\phi_o$. When $\phi_o$=0, S reaches maximum, and when $\phi_o$=π/2, S is 0—the DFOS cannot detect weak acoustic signals. In addition to sensitivity, $\phi_o$ also affects dynamic range and harmonic distortion. Under the condition that the DFOS operates in single fringe, again $\phi_o=0$ offers the best dynamic range and best harmonic distortion. When $\phi_o=\pi/2$, dynamic range is also 0, since any acoustic signal will bring the device into multi-fringe regime, rendering multi-value function caused uncertainty. Therefore, keeping $\phi_o=0$ is important for any single fringe operation interferometric acoustic sensor.

3.6.2 Static Q-Point Stabilization Using Microchannels

Q-point is defined as the point where the sine curve depicted in equation (35) crosses the V-axis. Note that $\phi_o$ is determined by the equilibrium gap width or pressure difference $\Delta P = P_f - P_b$ with no acoustic signal input. When the DFOS is used as a hydrophone or as an acoustic sensor immersed in oil for utility transformer PD monitoring, the front pressure of the diaphragm is $$P_f = P_{atm} + \rho g h + P_a e^{i\omega_a t} \quad (37)$$

where $P_{atm}$ is the atmospheric pressure, mostly determined by the location and weather, and $\rho g h$ the pressure of the liquid, either water or oil, with h as the depth of the liquid, and $\rho$ as the density of the liquid (FIG. 8). $P_a e^{i\omega_a t}$ is the acoustic signal for measurement, with an amplitude $P_a$ and frequency $\omega_a$. The static pressure difference at the front and back that determines the Q-point is $$\Delta P = P_f - P_b = P_{atm} + \rho g h - P_b \quad (38)$$

If the back is sealed or connected to the air as reported in [2] and [3], the difference of the front and back pressure of the diaphragm, and therefore the Q-point, will change with the weather and/or the depth of the water or oil where the sensor is immersed. In one embodiment, the typical detectable acoustic signal is less than 1 Pa, while 1 mm of water depth gives a difference of 10 Pa in the hydraulic pressure. Thus, without Q-stabilization mechanism, the DFOS cannot function as an effective acoustic sensor.

Figures 9, 9A:
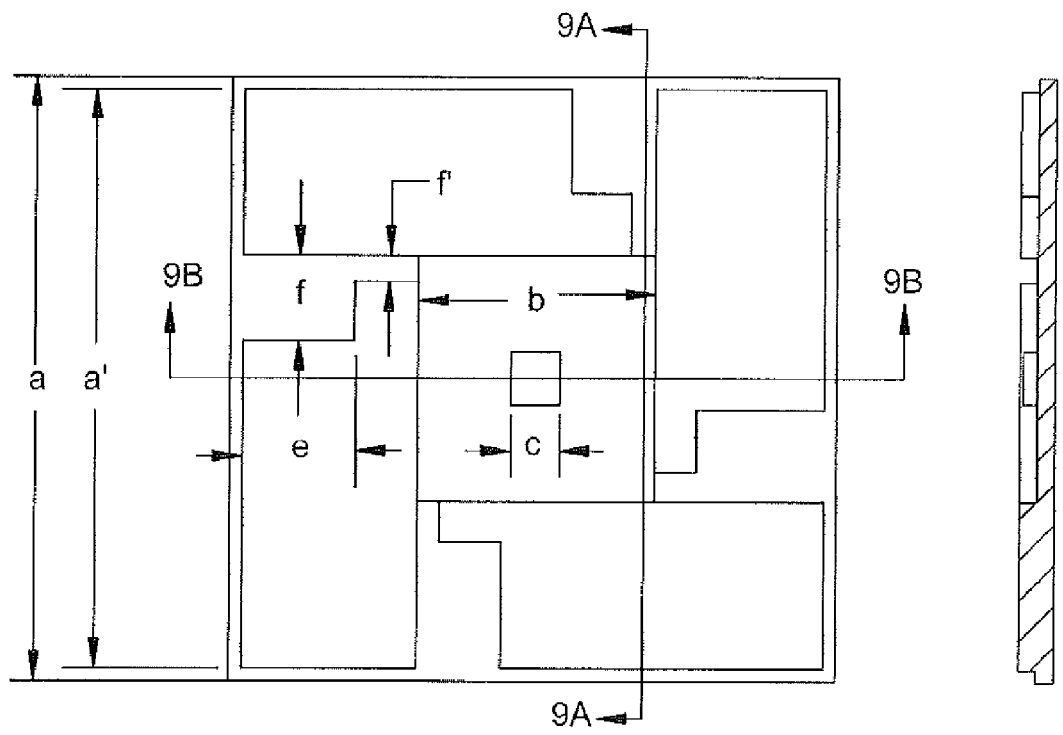
FIG. 9 shows the design of the Q-Point stabilized diaphragm-fiber optic sensor (DFOS).
Figure 9B:
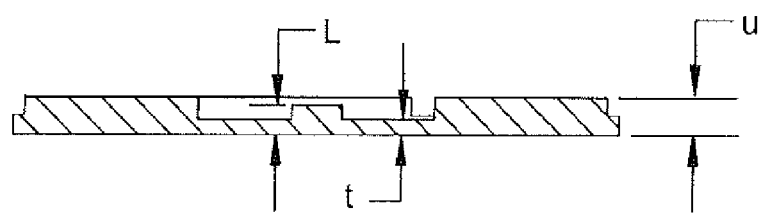

Another embodiment of the present invention introduces microchannels in the DFOS to solve this Q-point instability problem. As shown in FIG. 9, the 4 microchannels are etched out of the clamping support of the diaphragm when the diaphragm thickness t is formed. The backside of the diaphragm is thus not sealed, but connected to the outside through the microchannels. When the DFOS is immersed in water or oil, the pressure outside the cavity or backside of the DFOS is balanced by the pressure of the liquid. Inside the microchannels the backside or cavity pressure of the diaphragm $P_b$ plus the capillary pressure $P_{cap}$ is balanced by the liquid pressure outside the cavity $$P_b + P_{cap} = P_l = P_{atm} + \rho g\left(h + \frac{a+t}{2}\right) \quad (39)$$

The capillary pressure for a circular microchannel is expressed as [15]

$$P_{cap} = \frac{2\gamma_{LV}\cos\theta}{r} \quad (40)$$

where $\gamma_{LV}$ is the surface tension between the liquid (in one embodiment, water or oil) and its vapor inside the microchannel, $\theta$ the contact angle of the liquid and the solid (silicon), and r the radius of the channel. For microchannels with rectangular cross section, the pressure will be of the same order as expressed in equation (16). Using $\gamma_{LV} \sim 25 \times 10$ N/m for oil, and assuming $\theta$ to be 20°, $r=200\mu$, then $$P_{cap} \approx \frac{2 \times 25 \times 10^{-3} \times 0.94}{300 \times 10^{-6}} \approx 160 \text{ Pa} \quad (41)$$

which is negligible compared to the liquid static pressure $\rho g h$, typically on the order of 10,000 Pa. Substituting equation (15) to (14), then $$\Delta P = P_f - P_b \quad (42)$$
$$= (P_{atm} + \rho g h) - \left[P_{atm} + \rho g\left(h + \frac{a+t}{2}\right) + P_{cap}\right]$$
$$= -P_{cap} - \rho g\left(\frac{a+t}{2}\right) = const$$

$\Delta P$, which determines the Q-point, is a constant, independent of the environmental atmospheric pressure and liquid pressure. Therefore, after the DFOS is assembled and tested with the desired and optimized Q-point, the Q-point remains stabilized.

Equation (18) is derived for the case of the front of the diaphragm facing up. When the front of the diaphragm faces down or sideways, equation (18) will be modified without affecting the function of the microchannel as the Q-point stabilizer.

$$\text{Facing down} \quad \Delta P = -P_{cap} + \rho g\left(\frac{a+t}{2}\right) = const \quad (43)$$

$$\text{Facing sideway} \quad \Delta P = -P_{cap} = const \quad (44)$$

The dimensions of the microchannel are determined by the depth of liquid in which the DFOS is immersed. For the embodiment shown in FIG. 9, the 4 microchannels all have an area of f×e, and the same depth as the cavity. The volume of the 4 narrow necks with width f' is to protect the cavity or backside of the diaphragm from the liquid, and therefore can be neglected. Before the DFOS is immersed in the liquid, the volume of the cavity plus the 4 microchannels is initially $$V_1 = b^2 - c^2 + 4ef \quad (45)$$

The deepest $h_{max}$ of the liquid that the DFOS can go without the liquid invading the cavity is determined by Boyle's law $$P_1 V_1 = P_{max} V_{min} \quad (46)$$

where $P_1$, which is the atmospheric pressure $P_{atm}$, is the cavity or diaphragm backside pressure before the DFOS is immersed in the liquid, $P_{max}$ the maximum pressure the backside can tolerate, and $V_{min}$ the minimum of the backside volume. Substituting equation (21), as well as $P_{max} = P_{atm} + \rho g h_{max}$ and $V_{min} = b^2 - c$ into equation (22), the equation to calculate the dimensions of the microchannels is obtained:

$$h_{max} = \frac{P_{atm}}{\rho g} \frac{V_{microchannels}}{V_{cavity}} = \frac{P_{atm}}{\rho g} \frac{4ef}{b^2 - c^2} \quad (47)$$

Similar equations can be readily derived for other designs of the microchannels.

3.6.3 Dynamic Q-Point Stabilization Using Low Pass Microchannels

In many cases, especially when the DFOS is used as a hydrophone in the sea, in addition to the three terms in equation (37), there is a low frequency noise term due to the water wave and other noise sources. The correct and complete expression of the pressure acted on the front of the diaphragm is $$P_f = P_{atm} + \rho g h + \int P_n(\omega_n) e^{i\omega_n t} d\omega_n + \int P_a(\omega_a) e^{i\omega_a t} d\omega_a \qquad (48)$$

where the first integral is with respect to the noise spectrum $P_n(\omega_n)$, while the second integral is with respect to the acoustic signal spectrum $P_a(\omega_a)$. It is assumed that the noise frequency is much lower than the acoustic signal under measurement $$\omega_n \ll \omega_a \qquad (49)$$

and that the intensity of the acoustic signal is much smaller than that of the static pressures and low frequency noise $$P_a(\omega_a) \ll P_n(\omega_n), P_{atm}, \rho g h \qquad (50)$$

Ideally it is desired that the front pressure is expressed by equation (48), while the back pressure is $$P_b = P_{atm} + \rho g h + \int P_n(\omega_n) e^{i\omega_n t} d\omega_n \qquad (51)$$

so that $$\Delta P = P_f - P_b = \int P_a(\omega_a) e^{i\omega_a t} d\omega_a \qquad (52)$$

and only the acoustic signal is detected. A special system of low pass microchannels can be designed so that the static pressure and low frequency noise can be transmitted to the backside of the diaphragm while the higher frequency acoustic signal cannot.

4. Fabrication of Gaussian Beam DFOS

Figure 10:
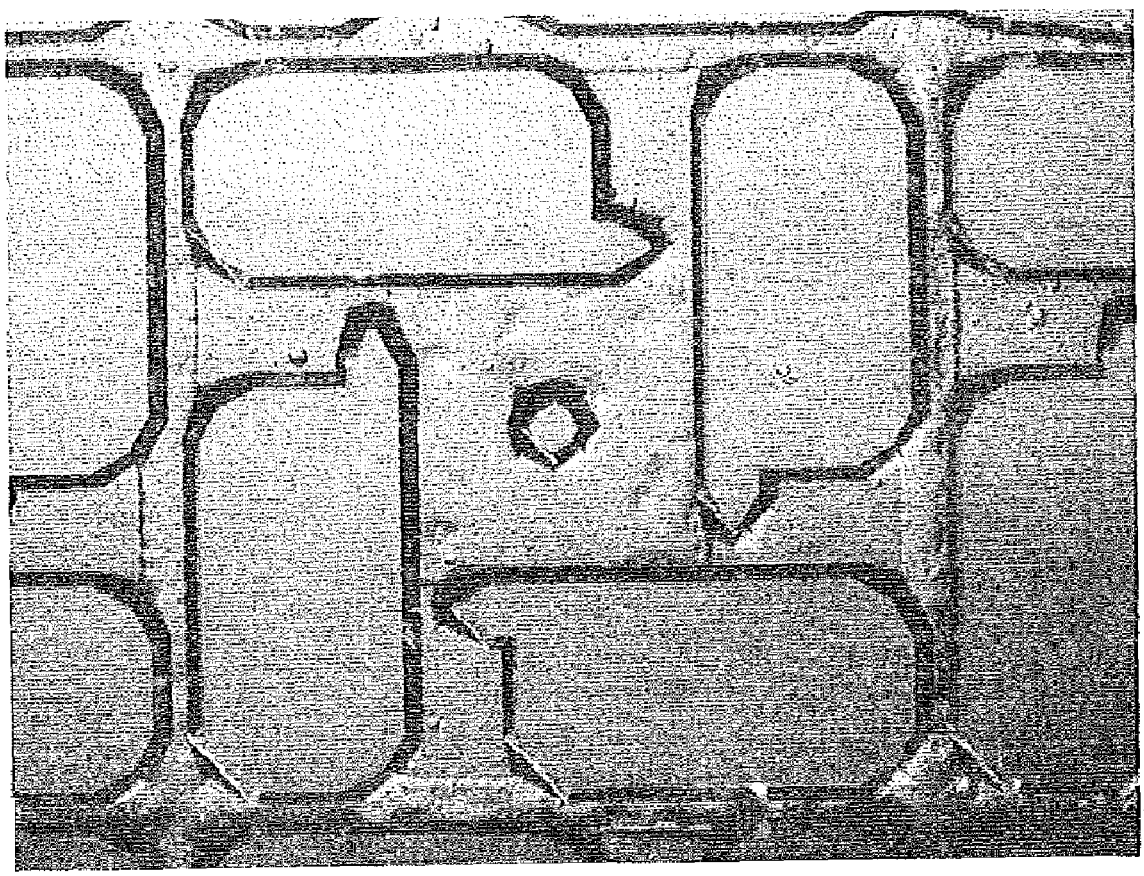
FIG. 10 is an optical microscopic image of the fabricated diaphragm of a Q-Point stabilized diaphragm-fiber optic sensor (DFOS) showing the embossed center and microchannels.

An embodiment of a DFOS with embossed center and microchannels of various dimensions and surface coating of the diaphragm and the fiber endface have been fabricated as shown in FIG. 10. Specifically, FIG. 10 is an optical microscopic image of a fabricated diaphragm of Q-Point stabilized diaphragm-fiber optic sensor (DFOS) showing an embossed center and microchannels according to the invention.

5. Experimental Testing of Gaussian Beam DFOS

Figure 11:
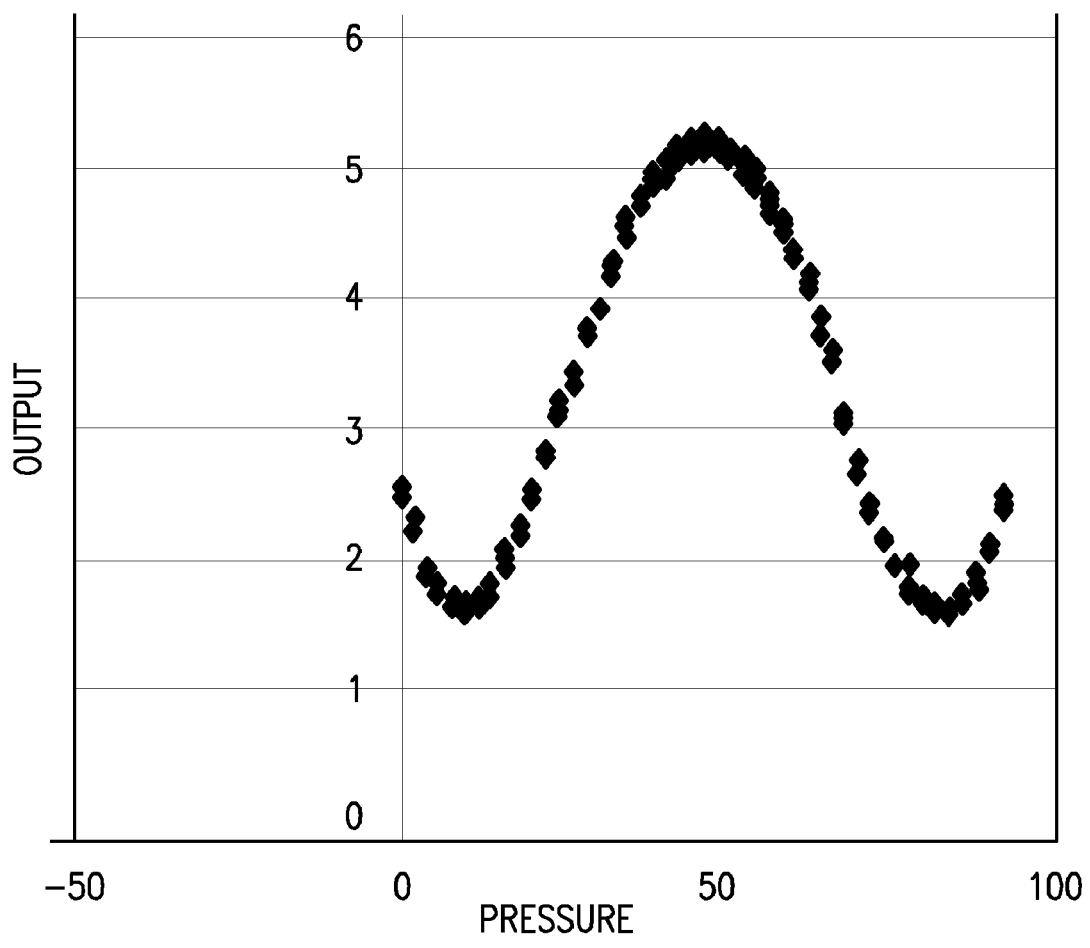
FIG. 11 depicts the static measurement of the output optic intensity as a function of pressure, which is in unit of centimeter of water column, and the optical output power is in arbitrary unit.
Figure 12:
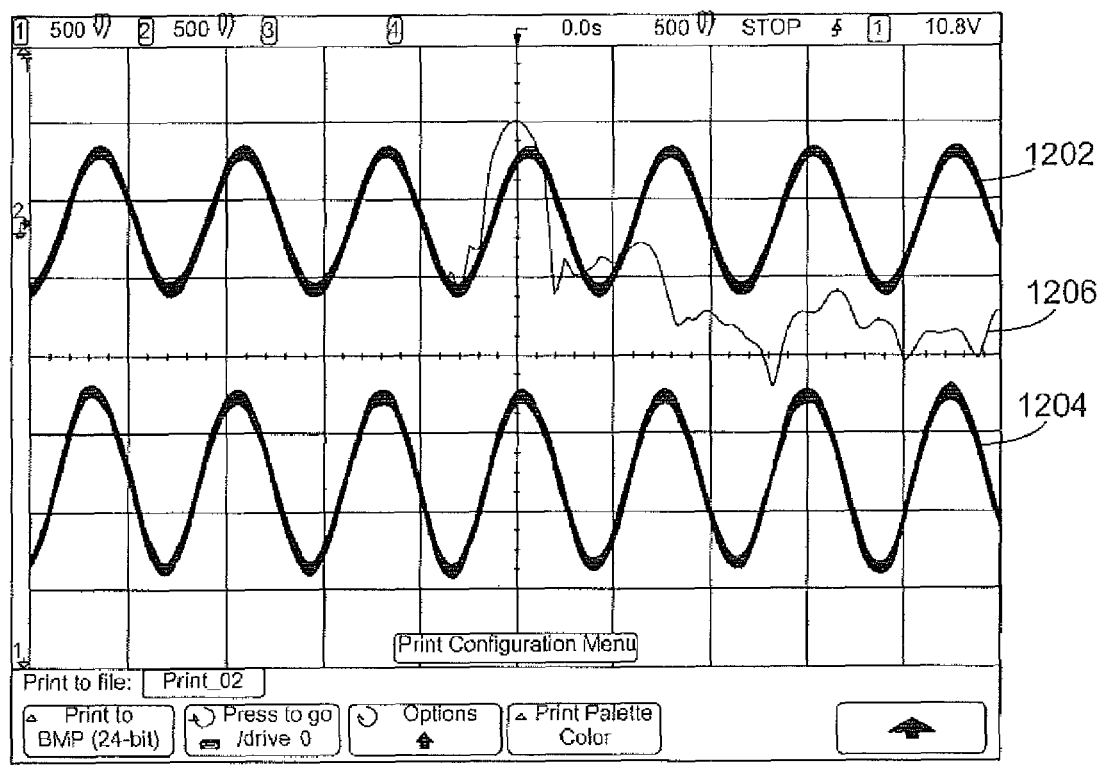
FIG. 12 is a graph of the dynamic measurement of the ultrasonic acoustic signal in water. The green waves represent the measurements of the Piezoelectric Acoustic Sensor (PZT) of PAC while the yellow waves represent the measurements of the diaphragm-fiber optic sensor (DFOS) of NJIT and PSE&G. A PAC Transducer generated the Acoustic Signal at 150 kHz.

Over 20 fabricated DFOS have been tested. In one embodiment, the basic performance is as designed, thus confirming the validity and practical usefulness of the invention. FIG. 11 shows the static relationship between output optic intensity as a function of pressure, which is the first static interference spectrum in a Fabry-Perot diaphragm-fiber optic sensor. Note that the characteristic of Equation (4) is verified through the bending of the diaphragm through more than half wavelength. FIG. 12 is the dynamic measurement of ultrasonic acoustic signal in water. Note that the acoustic signal measured using the MEMS Fabry-Perot DFOS 1204 is comparable to the output 1202 of a piezoelectric sensor placed next to the DFOS. The FFT of input signal peaked at 150 kHz is shown at 1206.

Applicant has attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

REFERENCES

[1] M. Born and E. Wolf, *Principles of Optics*, p. 327, 6th Edition, Pergamon Press, (1980).

[2] E. Hecht, *Optics*, p. 336, $2^{nd}$ Edition, Addison-Wesley Publishing Co. (1987).

[3] R. A. Atkins, J. H. Gardner, W. N. Gibler, C. E. Lee, M. D. Oakland, M. O. Spears, V. P. Swenson, H. F. Taylor, J. J. McCoy, and G. Beshouri, "Fiber Fabry-Perot pressure sensors for internal combustion engines", *Applied Optics*, Vol. 33, No. 7, pp. 1315-1319, March (1994).

[4] Youngmin Kim and Dean P. Neikirk, "Design for Manufacture of Micro Fabry-Perot Cavity-based Sensors," *Sensors and Actuators* A 50, January 1996, pp. 141-146.

[5] B. Yu, D. W. Kim, J. Deng, H. Xiao and A. Wang, "Fiber Fabry-Perot sensors for detection of partial discharges in power transformers", *Applied Optics*, Vol. 42, No. 16, pp. 3241-3250, June (2003).

[6] M. Yu, "Acoustic Measurements Using a Fiber Optic Sensor System", *Journal of Intelligent Systems and Structures*, Vo. 14, No. 7, 409-414 (2003)

[7] Xiaodong Wang, et al. "an ultra-sensitive optic MEMS sensor for partial discharge detection". *Journal of Micromechanics and Microengineering*, Vol. 15, pp. 521-527 (2005).

[8] Private communication, Jonathan Scot Grimsley, Litton Poly Scientific, Blacksburg Va.

[9] Amnon Yariv, *Optic Electronics*, $3^{rd}$ edition, p. 29, Library of Congress Cataloging in Publication Data, (1985).

[10] S. Timoshenko, *"Strength of Materials"*, Part II, 3rd Edition, p. 97, D. Van Nostrand Co., 1956.

[11] Mario di Giovanni, *Flat and Corrugated Diaphragm Design Handbook*, Marcel Dekker, New York and Base, 1982.

[12] P. M. Eleftherion, "Partial Discharge XXI: Acoustic Emission-Based PD Source Location in Transformers", *IEEE Electrical Insulation Magazines*, No. 6, pp. 22-26 November/December (1995).

[13] Tapanes, E. E., Oanca, I., Katsifolis, J., Goode, J. and Su, Q., "The Innovative Use of Optic Fibres for Condition Monitoring of High Voltage Equipment", *Proceedings: IEEE Optimization of Electric and Electronic Equipment* 1996 (Optim '96), Romania, pp. 791-814, May, (1996).

[14] M. Minhas, J. P. Reynders, P. J. de Klerk: "Failure in power system transformers and appropriate monitoring techniques", 11*th Int. Symposium on High Voltage Engineering*, London, paper 1.94.S23, (1999).

[15] CRC *Handbook of Chemistry and Physics*, F70, 51st Edition, the Chemical Rubber Co. (1970-1971).

We claim:

1. An embossed diaphragm-based fiber optic sensor, comprising:
   a single mode Optic fiber having an endface;
   a diaphragm having an embossed portion aligned with the single mode optic fiber; and
   a cavity between the diaphragm and the endface of the single mode optic fiber.

2. The sensor of claim 1, wherein the sensor is fabricated using micro mechanic-electrical system technology.

3. The sensor of claim 1, comprising an embossed portion positioned at a central portion of the diaphragm.

4. The sensor of claim 1, wherein the diaphragm is mechanically clamped.

5. The sensor of claim 1 further comprising at least one microchannel.

6. The sensor of claim 1, wherein the sensor is Q-point stabilized.

7. A fiber optic sensor comprising:
a single mode optic fiber having an endface;
a vibrating diaphragm having an embossed portion aligned with the single mode optic fiber; and
a Fabry-Perot type cavity between the diaphragm and the endface.

8. The sensor of claim 7, wherein the sensor is fabricated using micro mechanic-electrical system technology.

9. The sensor of claim 7, wherein the diaphragm is mechanically clamped.

10. The sensor of claim 7 further comprising at least one microchannel.

11. The sensor of claim 7, comprising an embossed portion positioned at a central portion of the diaphragm.

12. The sensor of claim 7, wherein the sensor is Q-point stabilized.

13. The sensor of claim 7, wherein the sensor is adapted for acoustic sensing in liquid mediums.

14. The sensor of claim 7, wherein the sensor is adapted for at least one of optical, mechanical, pressure, temperature, chemical, biometric and acoustic sensing.

15. The sensor of claim 7, wherein the sensor is adapted for detecting an on-line acoustic signature of sparking and arcing in a multitude of applications including at least one of large electric utility transformers, auto-transformers, tap-changers, phase angle regulators, voltage regulators, reactors, circuit breakers, pipe-type high voltage cables, and, other oil insulated utility and electric equipment.

16. A method of fabricating a diaphragm-based fiber optic sensor, the method comprising:
forming a cavity between a diaphragm and the endface of a single mode optic fiber;
embossing a portion of the diaphragm; and
positioning the embossed portion in alignment with the single mode optic fiber.

17. The method of claim 16 further comprising mechanically clamping the diaphragm.

18. The method of claim 16 further comprising forming microchannels in the diaphragm using micro mechanic-electrical system technology.

19. The method of claim 16 further comprising stabilizing the Q-point of the optic sensor.

20. The method of claim 16 further comprising detecting on-line acoustic signature of sparking and arcing in at least one of large electric utility transformers, auto-transformers, tap-changers, phase angle regulators, voltage regulators, reactors, circuit breakers, and pipe-type high voltage cables.

21. The method of claim 16, further comprising positioning the embossed portion at a central portion of the diaphragm.

22. The sensor of claim 1, wherein the alignment of the embossed portion and the fiber is at least one of: axial, lateral, and angular.

23. The sensor of claim 7, wherein the alignment of the embossed portion and the fiber is at least one of: axial, lateral, and angular.

24. The method of claim 16, wherein the alignment of the embossed portion and the fiber is at least one of: axial, lateral, and angular.

25. The sensor of claim 1, wherein the embossed portion is dimensioned to reflect a beam back to the optic fiber.

26. The sensor of claim 7, wherein the embossed portion is dimensioned to reflect a beam back to the optic fiber.

27. The method of claim 16, further comprising dimensioning the embossed portion to reflect a beam back to the optic fiber.

* * * * *